US009462627B2

(12) United States Patent
Majjigi et al.

(10) Patent No.: US 9,462,627 B2
(45) Date of Patent: Oct. 4, 2016

(54) UPLINK AND DOWNLINK SEMI-PERSISTENT SCHEDULING ALIGNMENT

(71) Applicant: Apple Inc., Cupertino, CA (US)

(72) Inventors: Vinay R. Majjigi, Sunnyvale, CA (US); Tarik Tabet, Los Gatos, CA (US); Christian W. Mucke, Cupertino, CA (US); Syed A. Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 120 days.

(21) Appl. No.: 14/451,035

(22) Filed: Aug. 4, 2014

(65) Prior Publication Data
US 2015/0085728 A1    Mar. 26, 2015

Related U.S. Application Data

(60) Provisional application No. 61/882,307, filed on Sep. 25, 2013.

(51) Int. Cl.
| | |
|---|---|
| *H04B 7/204* | (2006.01) |
| *H04W 4/00* | (2009.01) |
| *H04W 4/18* | (2009.01) |
| *H04J 4/00* | (2006.01) |

(Continued)

(52) U.S. Cl.
CPC ......... *H04W 76/048* (2013.01); *H04W 72/042* (2013.01)

(58) Field of Classification Search
CPC ......... H04W 72/0413; H04W 72/042; H04W 72/0446; H04W 72/1289; H04W 74/006; H04W 76/048

USPC ............. 370/310–350, 229–240, 395.4, 437, 370/498

See application file for complete search history.

(56) References Cited

U.S. PATENT DOCUMENTS

| | | | |
|---|---|---|---|
| 8,219,142 B2 * | 7/2012 | Khairmode | ........... H04W 88/06 455/552.1 |
| 8,315,217 B2 | 11/2012 | Montojo et al. | |

(Continued)

FOREIGN PATENT DOCUMENTS

| | | |
|---|---|---|
| EP | 2395797 | 12/2011 |
| EP | 2600680 A1 | 11/2012 |

OTHER PUBLICATIONS

Office Action, Taiwan Application No. 103129083, mailed Dec. 2, 2015, 15 pages.

(Continued)

*Primary Examiner* — Tri H Phan
(74) *Attorney, Agent, or Firm* — Meyertons Hood Kivlin Kowert & Goetzel, P.C.; Jeffrey C. Hood

(57) ABSTRACT

This disclosure relates to aligning semi-persistent scheduling (SPS) uplink and downlink communications. In one embodiment, a cellular base station may select SPS parameters for a wireless device. The SPS parameters may include a subframe offset, a downlink SPS interval, and an uplink SPS interval. The subframe offset may indicate a subframe at which both an initial downlink subframe and an initial uplink subframe are scheduled. An indication of the SPS parameters may be transmitted to the UE. The wireless device and the cellular base station may perform uplink and downlink communication according to the SPS parameters.

20 Claims, 7 Drawing Sheets

(51) Int. Cl.
*H04W 76/04* (2009.01)
*H04W 72/04* (2009.01)

(56) References Cited

U.S. PATENT DOCUMENTS

| | | | |
|---|---|---|---|
| 8,964,650 B2* | 2/2015 | Cai | H04W 72/04 370/329 |
| 9,246,656 B2* | 1/2016 | Kim | H04L 1/1861 |
| 2008/0112359 A1* | 5/2008 | Cleveland | H04L 5/023 370/329 |
| 2009/0207794 A1* | 8/2009 | Meylan | H04W 76/048 370/329 |
| 2010/0150091 A1 | 6/2010 | Yu et al. | |
| 2010/0172313 A1* | 7/2010 | Ho | H04W 72/042 370/329 |
| 2010/0195605 A1 | 8/2010 | Suzuki et al. | |
| 2011/0002281 A1* | 1/2011 | Terry | H04W 52/0216 370/329 |
| 2011/0032924 A1* | 2/2011 | Lee | H04W 76/048 370/345 |
| 2011/0223924 A1 | 9/2011 | Lohr et al. | |
| 2012/0069802 A1 | 3/2012 | Chen et al. | |
| 2013/0163536 A1 | 6/2013 | Anderson et al. | |
| 2014/0092829 A1 | 4/2014 | Han et al. | |
| 2014/0105164 A1 | 4/2014 | Moulsley et al. | |

OTHER PUBLICATIONS

Preliminary Report on Patentability, International Application No. PCT/US2014/051260, mailed Aug. 25, 2015, 6 pages.
International Search Report and Written Opinion from PCT/US2014/051260, mailed Oct. 29, 2014, pp. 1-9.
3GPP TSG-RAN-WG2 Meeting #59, "Semi-persistent scheduling and DRX control", Aug. 2007, pp. 1-6.

* cited by examiner

UPLINK AND DOWNLINK SEMI-PERSISTENT SCHEDULING ALIGNMENT

The present application claims benefit of priority to U.S. Provisional Application No. 61/882,307 titled "Uplink and Downlink Semi-Persistent Scheduling Alignment" and filed on Sep. 25, 2013, whose inventors are Vinay R. Majjigi, Tarik Tabet, Christian W. Mucke, and Syed A. Mujtaba, which is hereby incorporated by reference in its entirety as though fully and completely set forth herein.

FIELD

The present disclosure relates to wireless devices, and more particularly to a system and method for aligning uplink and downlink semi-persistent scheduling for a wireless device.

DESCRIPTION OF THE RELATED ART

Wireless communication systems are rapidly growing in usage. Further, wireless communication technology has evolved from voice-only communications to also include the transmission of data, such as Internet and multimedia content. There now exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others.

Semi-persistent scheduling (SPS) is used to allocate network resources in a semi-persistent manner in some cellular networks. When a base station specifies an SPS, the base station has the flexibility to choose separate parameters for uplink (UL) SPS and downlink (DL) SPS. While this allows the base station additional scheduling flexibility, it may also result in inefficient operation. Accordingly, improvements in the field would be desirable.

SUMMARY

Embodiments are presented herein of, inter alia, methods for aligning uplink and downlink semi-persistent scheduling (SPS), and of devices configured to implement the methods.

According to the techniques described herein, rather than use separate parameters for the initial uplink SPS offset and the initial downlink SPS offset when selecting SPS parameters for a wireless device, a base station may indicate these offsets to the wireless device using a single parameter value. While this may limit the scheduling flexibility of the base station, it may ensure that the initial uplink and downlink communications of the wireless device are aligned based on SPS.

Furthermore, if the initial uplink and downlink subframes scheduled according to SPS are aligned such as by using a single parameter to specify the same offset for both, alignment of uplink and downlink communications based on SPS may continue to be aligned for the duration of the SPS configuration if the base station also selects uplink and downlink SPS intervals to be equal, or such that one is an integer multiple of the other.

Aligning the uplink and downlink communications of the wireless device based on SPS may help the wireless device to reduce power consumption, at least in some instances. This may be particularly true when SPS is used in conjunction with connected-mode discontinuous reception (C-DRX), such that the wireless device is able to reduce power consumption by entering a sleep mode and powering down certain components between transmission and reception operations. For example, by aligning uplink and downlink communications, the length of time between such operations, and correspondingly the length of time for which the wireless device may remain in a low power state, may be increased. As another example, by aligning uplink and downlink communications, the overhead associated with warming up and shutting down shared uplink and downlink circuitry may occur less frequently than if uplink and downlink communications are offset from each other.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which.

Figure 1:
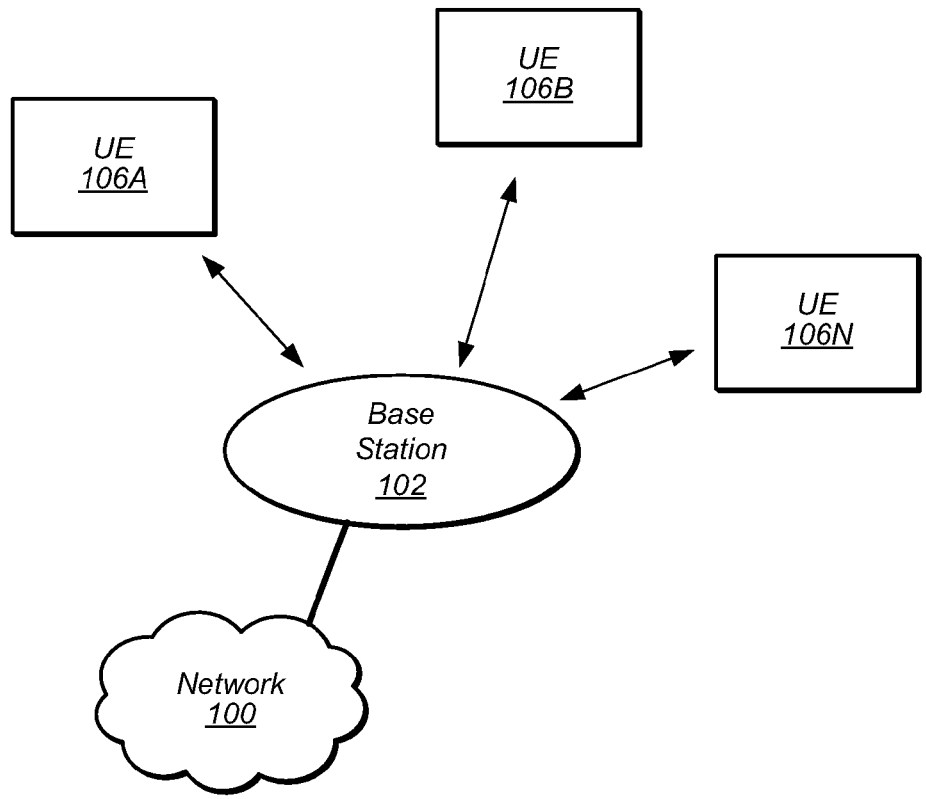
FIG. 1 illustrates an exemplary (and simplified) wireless communication system, according to one embodiment.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, unicast/multicast/broadcast, etc.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
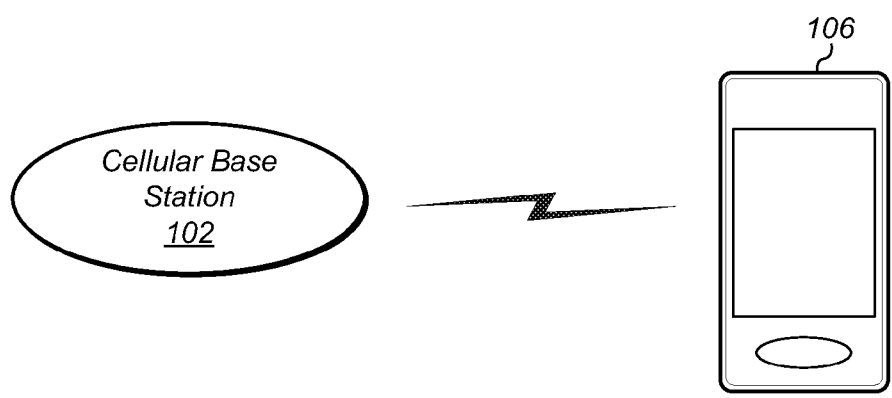
FIG. 2 illustrates a base station (BS) in communication with a user equipment (UE) device, according to one embodiment.

FIGS. 1-2—Communication System

FIG. 1 illustrates an exemplary (and simplified) wireless communication system, according to one embodiment. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A through 106N. Each of the user devices may be referred to herein as a "user equipment" (UE). Thus, the user devices are referred to as UEs or UE devices.

The base station 102 may be a base transceiver station (BTS) or cell site (a "cellular base station"), and may include hardware that enables wireless communication with UEs 106 according to one or more cellular communication protocols. The UE 106 and the cellular base station 102 may communicate using any of various cellular communication technologies such as GSM, UMTS (associated with, for example, WCDMA or TD-SCDMA air interfaces), LTE, LTE-Advanced (LTE-A), HSPA, 3GPP2 CDMA2000 (e.g., 1×RTT, 1×EV-DO, HRPD, eHRPD), etc.

As shown, the cellular base station may be equipped to communicate with a network 100 (e.g., a core network of a cellular service provider, a telecommunication network such as a public switched telephone network (PSTN), and/or the Internet, among various possibilities). Thus, the base station 102 may facilitate communication between UEs 106 and/or between the UEs 106 and the network 100. In particular, the cellular base station 102 may provide UEs 106 with various telecommunication capabilities, such as voice, SMS and/or data services.

A UE 106 may be capable of communicating using multiple wireless communication standards. For example, the UE 106 may be configured to communicate using a wireless networking (e.g., Wi-Fi) and/or peer-to-peer wireless communication protocol (e.g., BT, Wi-Fi peer-to-peer, etc.) in addition to at least one cellular communication protocol (e.g., GSM, UMTS (associated with, for example, WCDMA or TD-SCDMA air interfaces), LTE, LTE-A, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates a UE device 106 (e.g., UE device 106A illustrated in FIG. 1) in communication with the cellular base station 102, according to one embodiment. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In one embodiment, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include separate transmit and/or receive chains (e.g., including separate RF and/or digital radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 1×RTT (or LTE or GSM), and separate radios for communicating using each of Wi-Fi and Bluetooth. Other configurations are also possible.

Figure 3:
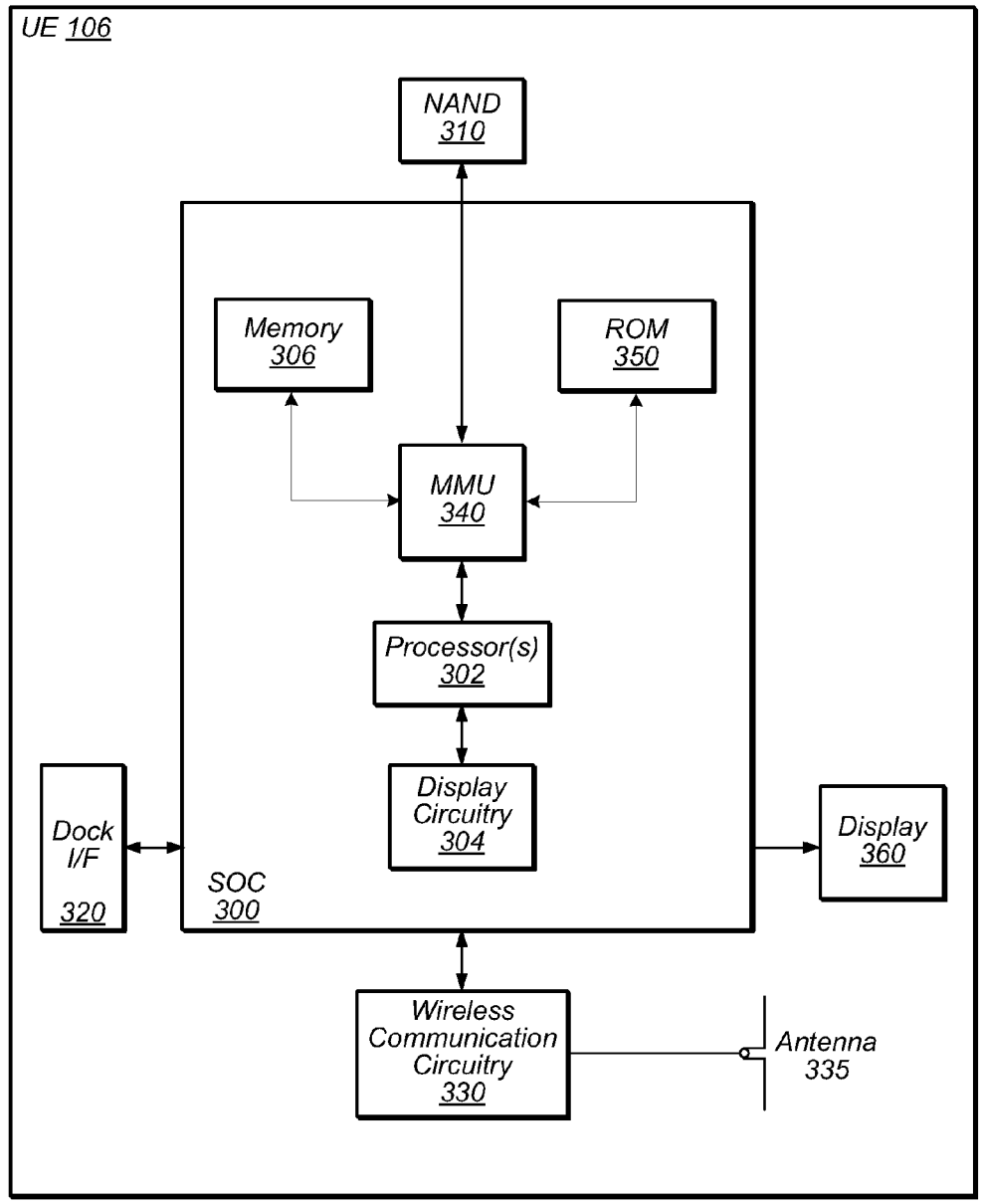
FIG. 3 illustrates an exemplary block diagram of a UE device, according to one embodiment.

FIG. 3—Exemplary Block Diagram of a UE

FIG. 3 illustrates an exemplary block diagram of a UE 106, according to one embodiment. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, CDMA2000, Bluetooth, Wi-Fi, GPS, etc.).

As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 5:
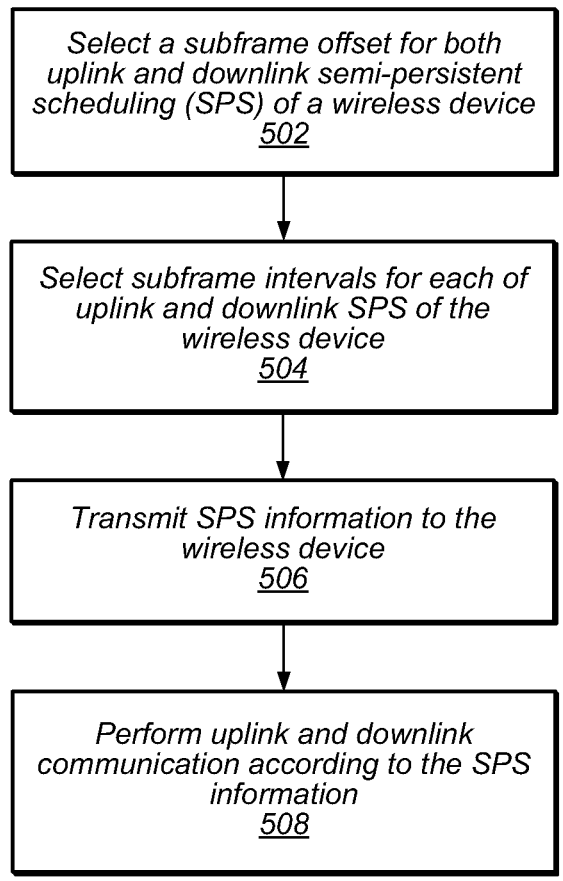
FIGS. 5-6 are flowchart diagrams illustrating aspects of an exemplary method for aligning uplink and downlink semi-persistent scheduling, according to one embodiment.
Figure 6:
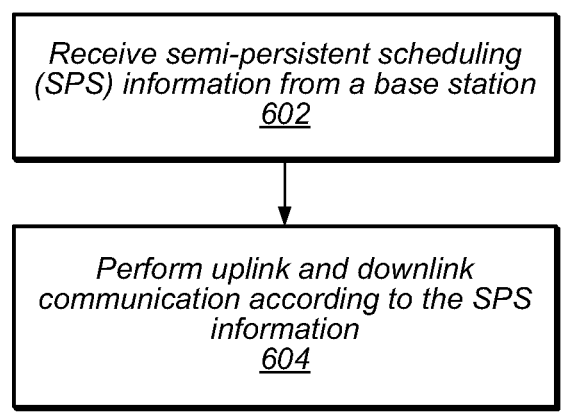

As described herein, the UE 106 may include hardware and software components for implementing features for aligning uplink and downlink semi-persistent scheduling, such as those described herein with reference to, inter alia, FIGS. 5-6. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIGS. 5-6.

Figure 4:
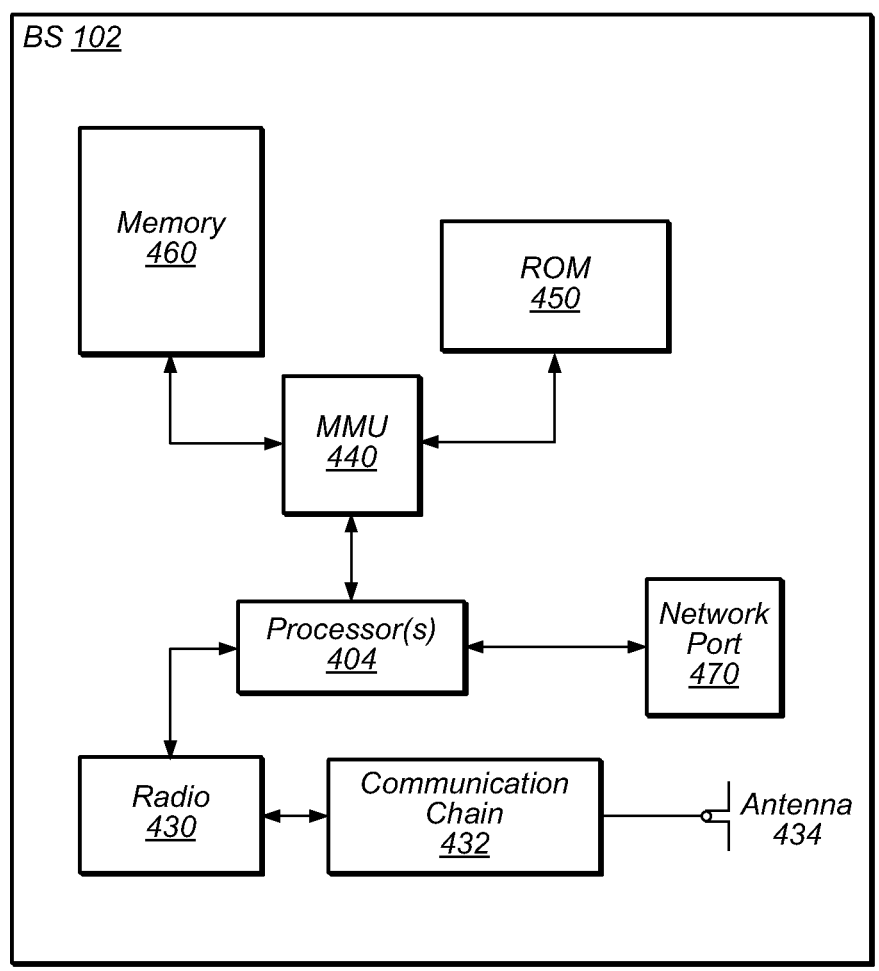
FIG. 4 illustrates an exemplary block diagram of a BS, according to one embodiment.

FIG. 4—Exemplary Block Diagram of a Base Station

FIG. 4 illustrates an exemplary block diagram of a cellular base station (BS) 102, according to one embodiment. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above with respect to FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, GSM, WCDMA, CDMA2000, Wi-Fi, etc.

The base station 102 may be configured to support power consumption efficient operation of a UE 106 in conjunction with cellular communication services. In particular, the BS 102 may include hardware and software components for implementing (or for use in conjunction with a UE 106 implementing) part or all of a method for aligning uplink and downlink semi-persistent scheduling, such as the features described herein with reference to, inter alia, FIGS. 5-6.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIGS. 5-6—Flowchart

Cellular communication may be used by a variety of different applications. The characteristics of the various applications which may use cellular communication may differ greatly from one another. For example, some applications, such as high-definition real-time video chat or videoconferencing applications and certain gaming applications, may be relatively demanding with respect to bandwidth, latency, and other communication link characteristics. Other applications, such as bulk data transfers (e.g., file uploads/downloads), may be very flexible with respect to bandwidth demands/usage, and may not be particularly sensitive to link latency.

An increasingly important type of application which may utilize packet-switched cellular communication link may be the voice application. In particular, certain cellular technologies such as LTE and LTE-A are moving towards an all internet protocol (IP) infrastructure, in which voice over IP (VoIP) packet-switched communications are used for voice communications instead of circuit-switched communications.

Voice applications may use any of a variety of codecs for compressing and decompressing voice data, including AMR-NB 12.2 kbps, AMR-WB 12.65 kbps, and many others. Given a particular codec, a voice application may typically utilize fixed (or approximately fixed) sized packets which may be communicated at regular (or approximately regular) intervals. Compared to many other applications which utilize cellular communication links, voice applications packets may be relatively small, and considering typical maximum cellular link capacity, voice applications may be relatively undemanding of network resources.

In consideration of the typically periodic nature and relatively fixed size of voice communications and applications having similar characteristics, a technique known as semi-persistent scheduling (SPS) has been developed, which allows a base station to allocate resources in a semi-persistent (e.g., periodic) manner without additional signaling. In other words, a single SPS allocation may be used to allocate resources for future (e.g., voice) packets, rather than specifying a grant for each packet/transmission.

In some cases SPS may be used in conjunction with a technique known as connected-mode discontinuous reception (C-DRX). This may allow the UE to power down some components of its radio when in a C-DRX sleep period, as the UE and the BS may implicitly have an agreement that the base station will not transmit to the UE at such a time. Note that while it may be advantageous to utilize C-DRX in conjunction with the methods of FIGS. 5-6, the methods may also be implemented without C-DRX if desired.

In existing implementations, uplink (UL) and downlink (DL) SPS may be configured separately. For example, a BS may have the flexibility to choose separate parameters for UL SPS and DL SPS. These parameters may include UL and DL subframe offsets (e.g., indicating a subsequent subframe in which an initial UL or DL communication may occur according to the SPS allocation) and UL and DL subframe intervals (e.g., indicating an interval between subframes in which UL or DL communication may occur subsequent to the initial UL or DL communication according to the SPS allocation). While this does provide the BS with significant scheduling flexibility, the flexibility may result in inefficient UE operation.

For example, consider a scenario in which a BS specifies an SPS configuration in which there is an offset between UL and DL subframes scheduled according to the SPS configuration. In particular in conjunction with C-DRX, the UE may end up monitoring the PDCCH more often than is optimal, resulting in excessive power consumption. Such a scenario is illustrated and described further with respect to FIGS. 7 and 9.

Accordingly, in order to ensure UL and DL alignment in conjunction with SPS, at least in some instances, it may be desirable to remove the flexibility of the BS to schedule an offset between UL and DL subframes scheduled according to SPS. For example, instead of using separate UL and DL subframe offset fields, a single subframe offset parameter that applies to both UL and DL subframes scheduled according to SPS might be utilized.

FIGS. 5-6 are a flowchart diagrams illustrating aspects of an exemplary method for aligning uplink and downlink semi-persistent scheduling communications, according to one embodiment. In particular, FIG. 5 illustrates an exemplary method for a base station to align uplink and downlink semi-persistent scheduling for a UE according to one embodiment, while FIG. 6 illustrates an exemplary method for a UE to perform uplink and downlink communications according to aligned uplink and downlink semi-persistent scheduling according to one embodiment. The methods shown in FIGS. 5-6 may be used in conjunction with any of the computer systems or devices shown in the above Figures, among other devices. As one possibility, the methods of FIGS. 5-6 may be implemented in conjunction with LTE and/or LTE-A. Some of the method elements shown may be performed concurrently, in a different order than shown, or may be omitted. Additional method elements may also be performed as desired. As shown, the methods may operate as follows.

In 502, the BS may select a subframe offset for both UL and DL communications based on SPS of a wireless device (e.g., a UE). In other words, a single subframe offset parameter that applies to both UL and DL communications based on SPS may be selected. The subframe offset may indicate a subframe at which both an initial downlink subframe based on the SPS and an initial uplink subframe based on the SPS are scheduled. For example, the subframe offset may indicate a number of subframes between a UE receiving an indication of the subframe offset and an initial UL and DL subframe based on the SPS. By selecting a single parameter that applies to both UL and DL, the initial UL and DL communication scheduled according to the SPS may be aligned.

In 504, the BS may select subframe intervals for each of UL and DL subframes based on the SPS for the wireless device. The downlink SPS interval may specify an interval between downlink frames based on the SPS after the initial downlink subframe based on the SPS. Similarly, the uplink SPS interval may specify an interval between uplink frames based on the SPS after the initial uplink subframe based on the SPS.

The BS may select equal subframe intervals for UL and for DL, as one possibility. Alternatively, the BS may select a different subframe interval for UL than for DL, at least in some scenarios. For example, it may be preferable to perform one or the other of UL and DL at a different (e.g., more or less frequent) interval than the other, for example depending on the type of communication being performed. As one particular example, for some voice communications, it may be desirable to perform UL communications more frequently than DL communications; for example, in the uplink, 'talk' packets may be communicated every 20 ms when appropriate, while in the downlink, silence packets (e.g., indicating a user is being silent) may be communicated every 160 ms. Other implementations (and other scenarios within a single implementation) may utilize different scheduling preferences. In general, it may be preferable that if the UL and DL interval are not equal, the greater interval is an integer multiple of the lesser interval, e.g., in order to align subsequent uplink and downlink subframes in addition to the initial SPS allocated UL and DL subframe. However, non-integer multiple intervals may be used if desired.

In 506, SPS information may be transmitted by the BS to the UE. Correspondingly, in 602, SPS information may be received by the UE from the BS. As one possibility, the SPS information may be communicated in a radio resource control (RRC) reconfiguration message. Alternatively, other RRC messages, or other layer (e.g., MAC) layer messages may be used if desired. The SPS information may include the subframe offset for both initial UL and DL subframes based on SPS, the UL subframe interval, and the DL subframe interval. The SPS information may thus specify a semi-persistent network resource allocation to the UE.

In 508, and correspondingly in 604, the BS and the UE may engage in uplink and downlink communication according to the SPS information. Thus, at the specified subframe offset, the BS and the UE may engage in both uplink and downlink communication; at each subsequent specified UL subframe interval, uplink communication may be performed (e.g., the UE may transmit uplink data to the BS); and at each subsequent specified DL subframe interval, downlink communication may be performed (e.g., the BS may transmit downlink data to the UE). This may continue in a semi-persistent manner until one or more conditions (which may include any of a variety of conditions, according to various implementations) for interrupting the semi-persistent scheduled communication occurs. Note that it may be the case that, based on the selected SPS information (e.g., if the UL subframe interval and DL subframe interval are selected such that one is equal to or an integer multiple of the other), the uplink and downlink communications based on SPS may be aligned for the duration of the communication based on SPS between the BS and the UE.

Note that at least in some embodiments, the UE may utilize connected-mode discontinuous reception (C-DRX) in conjunction with the above-described SPS behavior. For example, for certain periods of time between active (e.g., UL and/or DL) communication, the UE may enter a low power 'sleeping' state (e.g., may power down certain radio components). The C-DRX parameters (e.g., on-duration timer length, DRX cycle length, DRX inactivity timer length) may be selected in conjunction with the SPS parameters, in some instances, for example such that DL subframes and/or UL subframes scheduled according to SPS align with C-DRX on-durations. This may include selecting C-DRX parameters based at least in part on one or more SPS parameters, or vice-versa, or selecting both based on one or more other considerations (e.g., a desired transmission/reception interval for a voice or other type of application for which SPS is being configured), among various possibilities. Note also that the C-DRX parameters may be indicated to the UE by transmission in the same message as the SPS parameters (e.g., in an RRC re-configuration message), as one possibility, or in any of various other ways, as desired. Thus, the BS and the UE may perform uplink and downlink communication according to the C-DRX parameters in addition to the SPS parameters.

FIGS. 7-10

Figure 7:
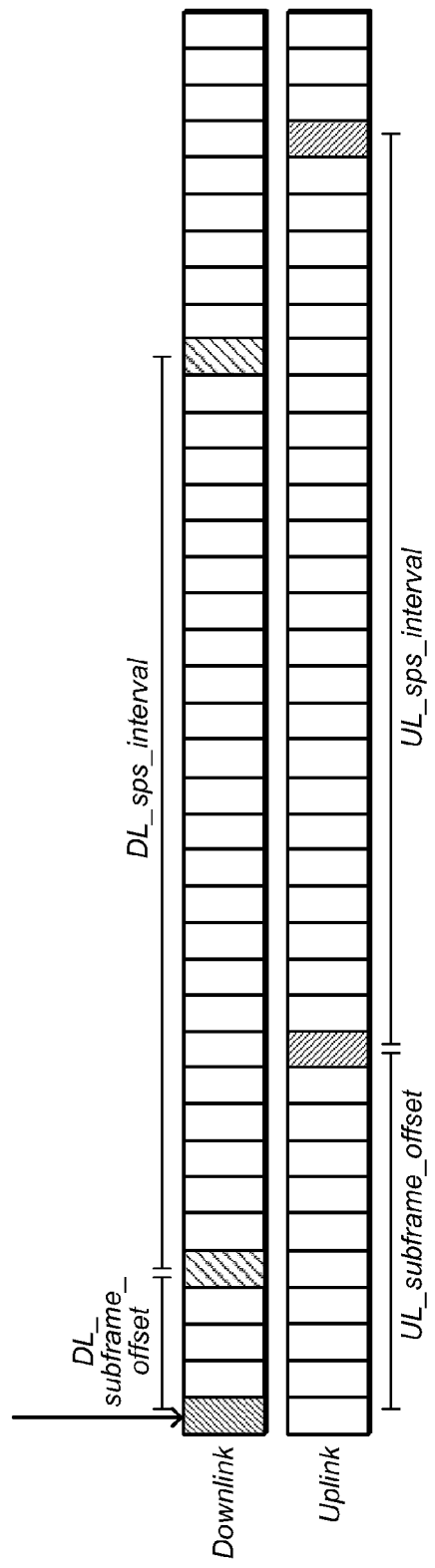
FIGS. 7-8 illustrate exemplary subframe scheduling without and with semi-persistent scheduling uplink and downlink alignment, according to one embodiment.
Figure 8:
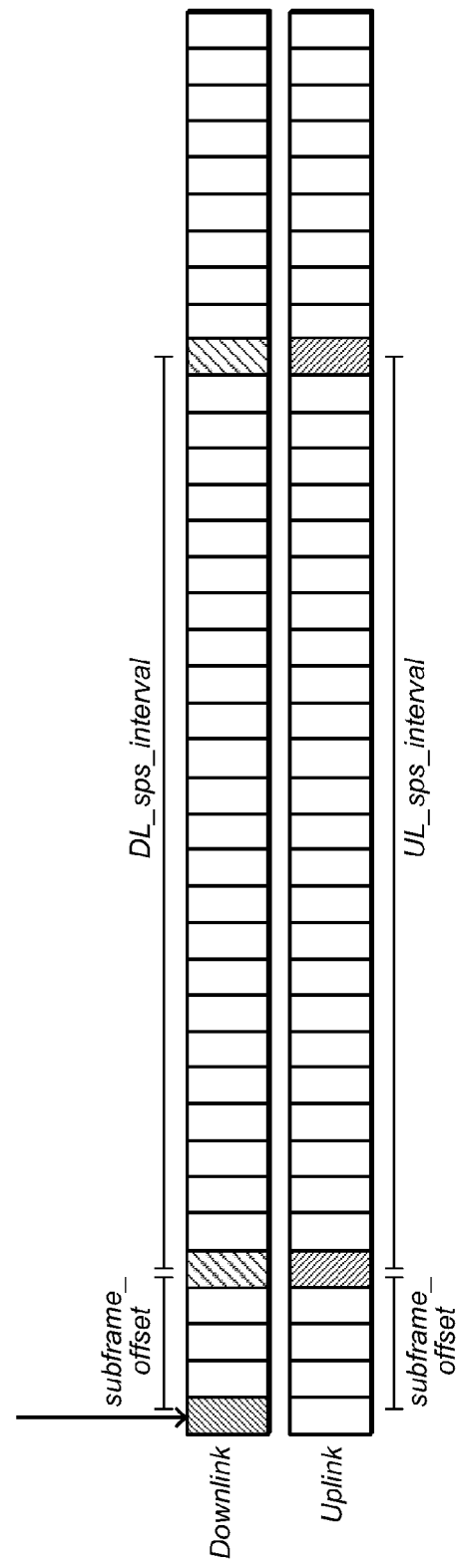
Figure 9:
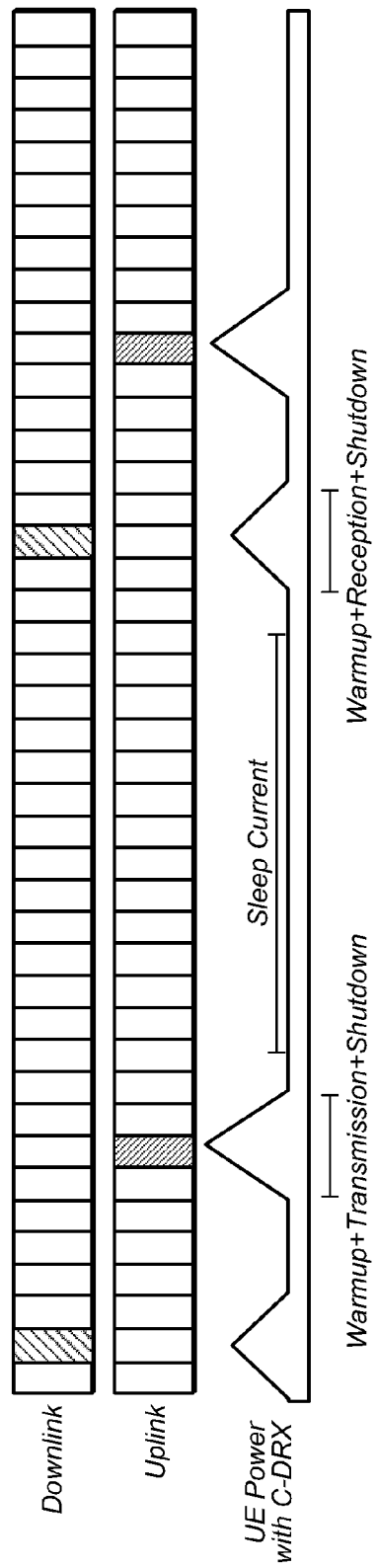
FIGS. 9-10 illustrate power consumption considerations in conjunction with exemplary subframe scheduling without and with semi-persistent scheduling uplink and downlink alignment, according to one embodiment.
Figure 10:
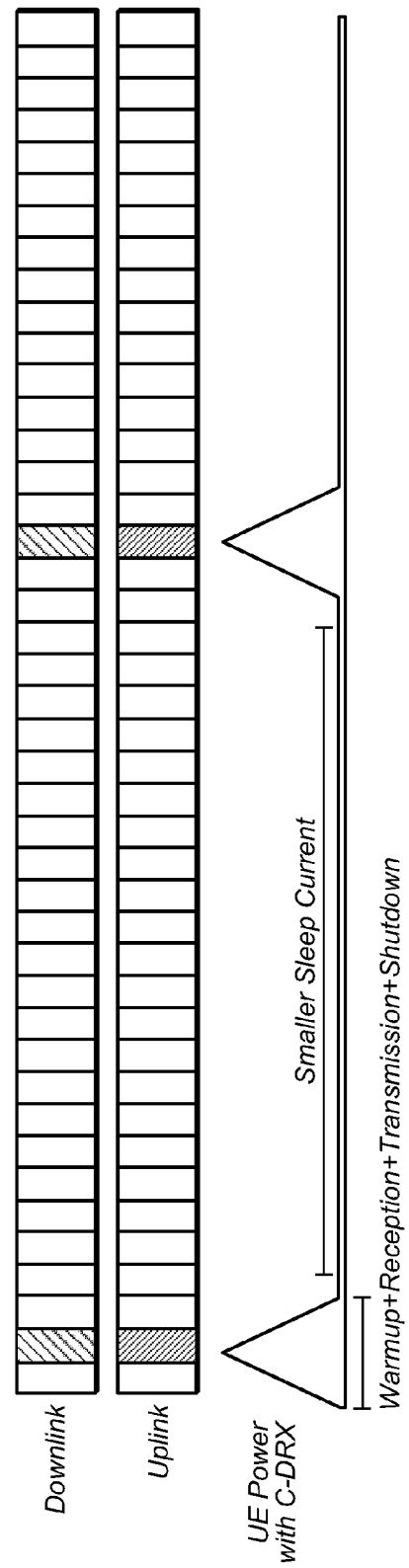

FIGS. 7-8 illustrate exemplary subframe scheduling without and with semi-persistent scheduling uplink and downlink alignment, according to one embodiment. FIGS. 9-10 illustrate power consumption considerations in conjunction with exemplary subframe scheduling without and with semi-persistent scheduling uplink and downlink alignment. FIGS. 8 and 10 more particularly illustrate an exemplary subframe scheduling scheme which might be used in conjunction with the methods illustrated in and described with respect to FIGS. 5-6. Note that while FIGS. 7-10 and the corresponding description thereof are provided for illustrative purposes, this information is provided by way of example only, and is not intended to be limiting to the disclosure as a whole.

As shown in FIG. 7, in a certain subframe (e.g., the first subframe shown in FIG. 7), SPS information may be transmitted by a base station and received by a wireless device (e.g., as a downlink communication). In the scenario illustrated in FIG. 7, the SPS information includes four parameters: DL_subframe_offset, UL_subframe_offset, DL_sps_interval, and UL_sps_interval.

If DL_subframe_offset has a different value than UL_subframe_offset, as illustrated, then the first DL subframe according to the SPS may be different (offset from) the first UL subframe, such that no UL communication is performed during the DL subframe, while no DL communication is performed during the UL subframe.

Furthermore, depending on the UL and DL intervals selected, this offset may be propagated through many if not all subsequent UL and DL subframes allocated according to the SPS information. For example, if the same value is selected for DL_sps_interval and UL_sps_interval such as illustrated in FIG. 7, UL and DL subframes may continue to be offset by the same number of subframes as the difference between the values of DL_subframe_offset and UL_subframe_offset through all subsequent subframes allocated according to the SPS information.

As shown in FIG. 8, SPS information may also be transmitted by a base station and received by a wireless device (e.g., as a downlink communication) in a certain subframe. However, in contrast with the scenario of FIG. 7, in the scenario of FIG. 8 the SPS information includes just three parameters: subframe_offset, DL_sps_interval, and UL_sps_interval.

Thus, as shown in FIG. 8, since the same parameter (e.g., subframe_offset) may be used to specify the subframe offset for both the first UL subframe and the first DL subframe allocated according to the SPS information, the UE's initial UL and DL allocation may inherently be aligned to the same subframe.

Additionally, since the first UL subframe and the first DL subframe allocated according to the SPS information may be aligned (and depending also on the UL and DL intervals selected), this alignment may be propagated through many if not all subsequent UL and DL subframes allocated according to the SPS information. For example, if the same value is selected for DL_sps_interval and UL_sps_interval such as illustrated in FIG. 8, UL and DL subframes may continue to be aligned through all subsequent subframes allocated according to the SPS information. It should further be noted that even if different values are selected for DL_sps_interval and UL_sps_interval, as long as one value is an integer multiple of the other, the UL and DL subframes may continue to be aligned whenever the less frequent interval occurs.

FIGS. 9-10 illustrate power consumption considerations in conjunction with exemplary subframe scheduling without and with semi-persistent scheduling uplink and downlink alignment, according to one embodiment. In particular, FIGS. 9-10, respectively, illustrate similar exemplary scenarios as illustrated in FIGS. 7-8, respectively, but additionally illustrate exemplary possible power consumption profiles which may be associated with those scenarios.

Since the DL and UL subframes are offset in the scenario of FIG. 9, DL and UL circuitry operate with separate overheads for warmup and shutdown when the UE is receiving or transmitting. In contrast, since the DL and UL subframes are aligned in the scenario of FIG. 10, the overhead of warming up and shutting down circuitry shared by DL and UL may be reduced.

In other words, because the DL and UL subframes are offset in the scenario of FIG. 9 but aligned in the scenario of FIG. 10, the UE may experience twice as many power consumption peaks in the scenario of FIG. 9 as in the scenario of FIG. 10. More particularly, because at least a portion of the UE circuitry may be shared for use in UL and DL communications, aligning UL and DL communications may, for example, approximately halve the warm up and shut down overhead power consumption of those shared circuitry components. Thus, the total power consumption for the aligned DL and UL power consumption peak of the scenario of FIG. 10 may be less than the total combined power consumption for the separate DL and UL power consumption peaks of the scenario of FIG. 10.

As a further consideration, the offset between UL and DL in the scenario of FIG. 9 may result in a shorter period of time between communications than in the scenario of FIG. 10. As a result (e.g., in particular in conjunction with C-DRX operation), it may be the case that fewer circuitry components are shut down and/or circuitry components may be shut down for shorter periods of time in the scenario of FIG. 9 than in the scenario of FIG. 10. In other words, the sleep current (sleeping power consumption) between power consumption peaks may be greater in the scenario of FIG. 9 than in the scenario of FIG. 10.

FIG. 11—C-DRX

Figure 11:
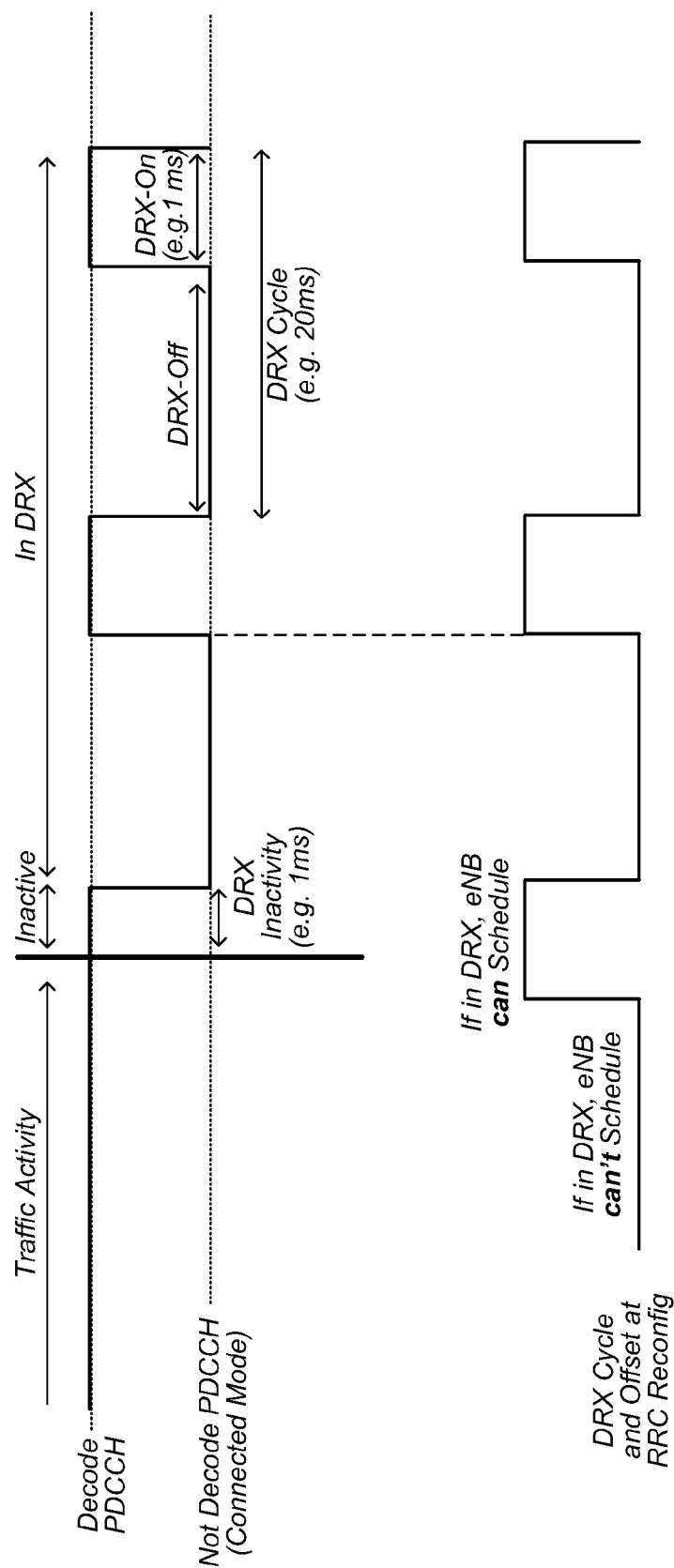
FIG. 11 illustrates exemplary connected-mode discontinuous reception (C-DRX) operation of a wireless device, according to one embodiment.

FIG. 11 illustrates exemplary connected mode discontinuous reception (C-DRX) operation of a wireless device, according to one embodiment. Note that while FIG. 11 and the corresponding description thereof are provided for illustrative purposes, this information is provided by way of example only, and is not intended to be limiting to the disclosure as a whole.

C-DRX may allow a UE to periodically sleep and not continuously monitor one or more communication channels (e.g., a control channel, such as the physical downlink control channel (PDCCH) in LTE). C-DRX may significantly reduce power consumption, at least in some scenarios, though there may be some trade-off with respect to latency of communications.

The parameters of C-DRX operation may be network-defined, and may be communicated by a base station to a wireless device as part of a configuration message. For example, in LTE, an RRC reconfiguration message may be used. The parameters may include DRX cycle length, an on-duration timer, and a DRX inactivity timer. The DRX cycle length may indicate the duration of one cycle of UE on/off time; for example, cycle lengths of 320 ms (e.g., for long DRX), 20 ms (e.g., for short DRX), or any of various other values (e.g., possibly depending on the specification of the communication protocol being used) may be used in various implementations. The on-duration timer may indicate the duration of time for which a UE should monitor a control channel (e.g., the PDCCH) per DRX cycle. On-duration lengths of 10 ms, 5 ms, 1 ms, or any other length (e.g., possibly depending on the specification of the communication protocol being used) may be possible. The DRX inactivity timer may indicate an amount of time for which a UE should continuously monitor the control channel after receiving a scheduling message. If no scheduling request is received for the indicated length of time, the UE may go to sleep (e.g., enter C-DRX). Note that the DRX inactivity timer may be reset if a scheduling request is received. DRX inactivity timer lengths of 100 ms, 200 ms, or any other length (e.g., possibly depending on the specification of the communication protocol being used) may be possible. Other (alternative or additional) parameters are also possible.

Additionally, in some implementations, a BS may explicitly indicate to a UE to begin C-DRX behavior. For example, in LTE, it may be possible for a UE to receive a media access control (MAC) control element (CE) DRX command from a base station, which may indicate to a UE to begin C-DRX behavior even if the DRX inactivity timer has not expired.

Exemplary C-DRX operation/behavior in conjunction with LTE is illustrated in FIG. 11. The top portion of FIG. 11 may represent UE activity, while the bottom portion of FIG. 11 may represent BS activity. As shown, a UE may initially decode the PDCCH continuously. At a certain point (e.g., based on the DRX inactivity timer or a DRX command), the UE may transition to C-DRX behavior. While in C-DRX, the UE may alternate between 'waking' and 'sleeping' periods, in which the UE does and does not monitor the PDCCH respectively. During the waking (or 'DRX-on' or 'on-duration') portions, the BS may (if desired) schedule communications or otherwise provide control information, and since the UE may be monitoring the PDCCH during these portions, the UE may receive these communications. During the sleeping (or 'DRX-off') portions, the BS may not schedule communications or otherwise provide control information, so the UE may not miss any scheduling or other control information as a result of being in a low power state and not monitoring the PDCCH.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A cellular base station (BS), comprising:
a radio; and
a processing element operably coupled to the radio;
wherein the radio and the processing element are configured to:
select semi-persistent scheduling (SPS) parameters for a wireless user equipment (UE) device, wherein the SPS parameters comprise a subframe offset, a downlink SPS interval, and an uplink SPS interval, wherein the subframe offset indicates a subframe at which both an initial downlink subframe and an initial uplink subframe are scheduled;
transmit an indication of the SPS parameters to the UE; and
perform uplink and downlink communication with the UE according to the SPS parameters.

2. The BS of claim 1,
wherein the downlink SPS interval and the uplink SPS interval are equal or one is an integer multiple of the other.

3. The BS of claim 1,
wherein the radio and the processing element are configured to perform uplink and downlink communication with the UE according to the SPS parameters using connected-mode discontinuous reception (C-DRX).

4. The BS of claim 1,
wherein the radio and the processing element are further configured to select C-DRX cycle parameters for the UE based at least in part on one or more of the subframe offset, the downlink SPS interval, and the uplink SPS interval.

5. The BS of claim 1,
wherein the indication of the SPS parameters is transmitted in a radio resource control (RRC) reconfiguration message.

6. A method for a cellular base station (BS) to align uplink and downlink communications based on semi-persistent scheduling (SPS) for a wireless user equipment (UE) device, the method comprising:
selecting SPS parameters for the UE, wherein the SPS parameters comprise at least a subframe offset, wherein the subframe offset indicates a subframe at which both an initial SPS downlink subframe based on SPS and an initial uplink subframe based on SPS for the UE are scheduled;
transmitting an indication of the SPS parameters to the UE; and
performing uplink and downlink communication with the UE according to the SPS parameters.

7. The method of claim 6,
wherein performing uplink and downlink communication with the UE according to the SPS parameters comprises performing both uplink and downlink communication with the UE during the subframe indicated by the subframe offset.

8. The method of claim 6,
wherein the SPS parameters further comprise a downlink SPS interval and an uplink SPS interval,
wherein the downlink SPS interval specifies an interval between downlink subframes based on SPS after the initial downlink subframe based on SPS,
wherein the uplink SPS interval specifies an interval between uplink subframes based on SPS after the initial uplink subframe based on SPS.

9. The method of claim 8, the method further comprising:
selecting the downlink SPS interval and the uplink SPS interval such that one is an integer multiple of or equal to the other.

10. The method of claim 6, the method further comprising:
selecting connected-mode discontinuous reception (C-DRX) parameters for the UE, wherein the C-DRX parameters are selected in conjunction with the SPS parameters to align uplink and downlink subframes based on SPS with C-DRX on-durations;
transmitting an indication of the C-DRX parameters to the UE; and
performing uplink and downlink communication with the UE according to the C-DRX parameters in addition to the SPS parameters.

11. The method of claim 6, wherein selecting the SPS parameters for the UE specifies a semi-persistent network resource allocation to the UE.

12. The method of claim 6, wherein the BS is configured to communicate with the UE according to LTE.

13. A wireless user equipment (UE) device, comprising:
a radio; and
a processing element operably coupled to the radio;
wherein the radio and the processing element are configured to:
receive semi-persistent scheduling (SPS) information from a cellular base station (BS), wherein the SPS information comprises a subframe offset, a downlink SPS interval, and an uplink SPS interval, wherein the subframe offset applies to both downlink and uplink communication based on SPS; and
perform uplink and downlink communication with the BS according to the SPS information.

14. The UE of claim 13,
wherein the SPS information is received in a radio resource control (RRC) message.

15. The UE of claim 14,
wherein the subframe offset indicates a number of subframes between receiving the RRC message and both initial downlink and uplink subframes based on SPS.

16. The UE of claim 15, wherein performing uplink and downlink communication with the BS according to the SPS information comprises performing both uplink and downlink communication during the subframe scheduled as both the initial downlink subframe based on SPS and the initial uplink subframe based on SPS according to the subframe offset.

17. The UE of claim 15,
wherein the downlink SPS interval specifies a periodic interval between downlink subframes based on SPS after the initial downlink subframe based on SPS,
wherein the uplink SPS interval specifies a periodic interval between uplink subframes based on SPS after the initial uplink subframe based on SPS,
wherein one of the downlink SPS interval and the uplink SPS interval is an integer multiple of or equal to the other.

18. The UE of claim 13,
wherein the subframe offset, the downlink SPS interval, and the uplink SPS interval schedule uplink and downlink subframes based on SPS to align for the duration of communication based on SPS between the BS and the UE.

19. The UE of claim 13, wherein the radio and the processing element are further configured to:
receive C-DRX information from the BS, wherein the C-DRX information comprises a DRX cycle length, an on-duration timer length, and a DRX inactivity timer length; and
perform uplink and downlink communication with the BS according to the C-DRX information in addition to the SPS information.

20. The UE of claim 19,
wherein the C-DRX information and the SPS information are configured to align uplink and downlink subframes based on SPS with C-DRX on-durations.

* * * * *